United States Patent [19]

Norman

[11] Patent Number: 4,998,940
[45] Date of Patent: Mar. 12, 1991

[54] ROTATABLE ROLLER AND METHOD OF USE

[76] Inventor: Linn V. Norman, 1505 N. Royer, Colorado Springs, Colo. 80907

[21] Appl. No.: 416,461

[22] Filed: Oct. 3, 1989

[51] Int. Cl.⁵ .............................................. B60B 33/06
[52] U.S. Cl. ........................................ 16/34; 16/33; 16/DIG. 42
[58] Field of Search .......... 16/33, 34, 44, 19, DIG. 42

[56] References Cited

U.S. PATENT DOCUMENTS

| 112,740 | 3/1871 | Ryder. | |
|---|---|---|---|
| 251,949 | 1/1882 | Risdon | 16/32 |
| 1,019,302 | 3/1912 | Butcher | 16/32 |
| 1,136,915 | 4/1915 | Adams | 16/32 |
| 1,145,096 | 7/1915 | Thomas | 16/32 |
| 1,931,446 | 10/1933 | Muller | 16/33 |
| 2,460,094 | 1/1949 | Little | 16/34 |
| 2,490,953 | 12/1949 | Eriksen | 16/32 |
| 2,779,049 | 1/1957 | Hoddevik | 16/34 |
| 2,814,498 | 11/1957 | Hull | 280/43 |
| 4,008,507 | 2/1977 | Smith | 16/34 |

Primary Examiner—Richard K. Seidel
Assistant Examiner—Carmine Cuda
Attorney, Agent, or Firm—Linda Flewellen Gould

[57] ABSTRACT

An object may be easily moved across a surface by means of a rotatable roller mechanism, and may be secured in a desired location on that surface by rotation of the roller mechanism. The rotatable roller mechanism comprises a rigid plate containing a slot, a bar designed to seat within that slot, a holding mechanism allowing the bar to rotate in close proximity to the slot in the rigid plate, and a roller mechanism attached to the bar. The roller mechanism may consist of wheels or flat rollers surrounding an axle, which is attached to the bar by two connecting pieces. The rigid plate is attached to the underside of the object. When the object is lifted, the bar rotates in the holding mechanism to a position perpendicular to the rigid plate. The bar is held in this position when the object is lowered, by means of the bar fitting into the slot. In this manner the rollers are held against the surface, and the object may be easily moved across the surface. By lifting the object, the bar may be rotated to a stationary position parallel to the rigid plate. When the object is lowered with the bar in this stationary position, the roller mechanism does not contact the surface, and the object will remain in a fixed position.

13 Claims, 2 Drawing Sheets

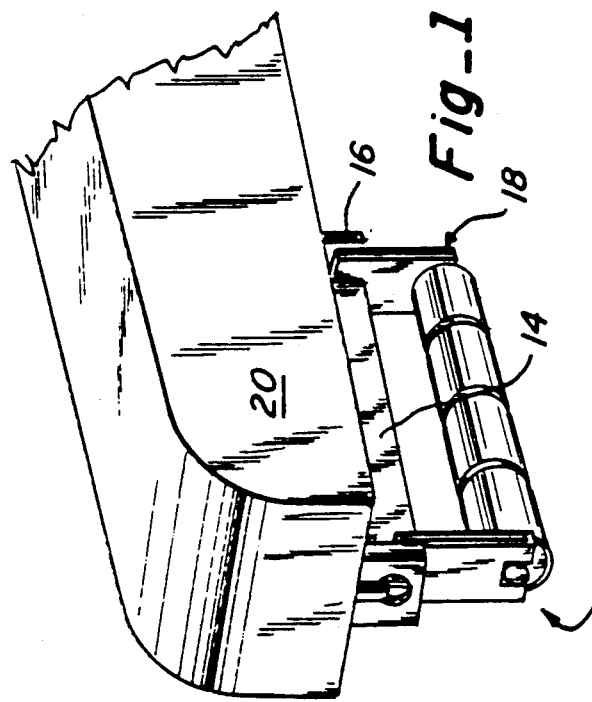
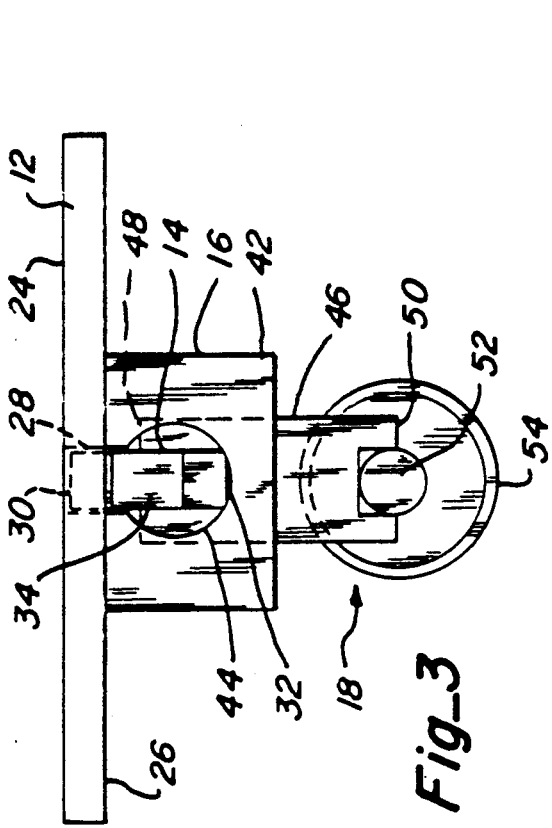
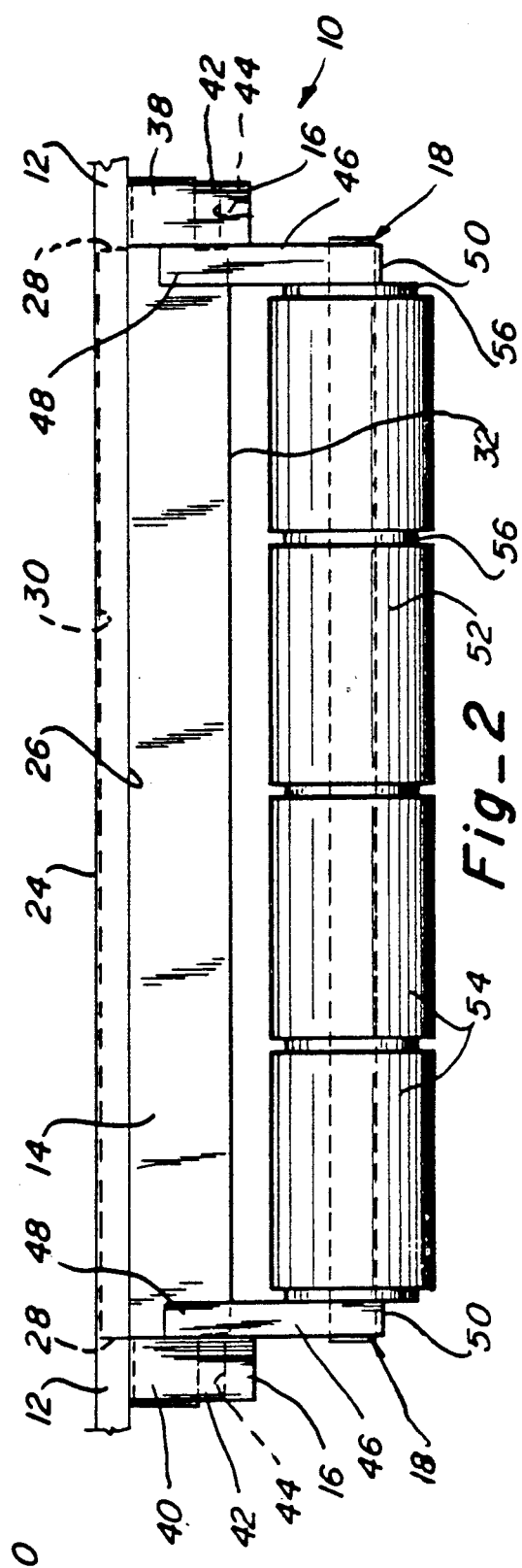

ROTATABLE ROLLER AND METHOD OF USE

BACKGROUND OF THE INVENTION

1. Technical Field

This invention pertains to a roller mechanism to be attached to an object, such as a table or other piece of furniture, to enable that object to be easily moved across a surface, such as a floor. The roller mechanism may be rotated to permit the object to rest on the surface in a stationery position.

The rotatable roller facilitates the movement of heavy machinery, equipment, or furniture, which may be rolled across a floor using the method of this invention. As is frequently desired or necessary for safety, such machinery and furniture may be left in a stationary position, without a complex disabling or removal of the roller mechanism.

2. Background Art

Various retractable mechanisms are known in the prior art which may be attached to furniture or equipment to facilitate the movement of that object. For example, U.S. Pat. No. 2,490,953 to Eriksen and 112,740 to Ryder describe caster mechanisms which may be used to allow various types of furniture to be rolled across a floor surface. In each case, the caster extends from the furniture on a rod, which rod may be moved to an extension position or a retracted position, and locked into position by engaging a screw or lever. The furniture to which such a caster is attached must have significant empty space between the body of the furniture and the floor to permit storage of the caster mechanism in its retracted position.

Similarly, the stove leg described in U.S. Pat. No. 251,949 to Risdon involves a caster on a rod. The mechanism may be contained within a leg as large and tall as the stove leg contemplated by the patent, but could not be utilized to move equipment which lies flat on a floor surface, without legs.

Less empty space under the furniture is required to store the retracted furniture caster described in U.S. Pat. No. 1,145,096 to Thomes. Nevertheless, movement of the caster through an arched slot into a locked position does require space which makes it impossible for the furniture to lie flush with the surface. Furthermore, this mechanism requires manually or foot applied pressure to move the caster to its retracted position.

Similar axle mounted casters are described in U.S. Pat. No. 1,019,302 to Butcher, 1,136,915 to Adams, and 4,008,507 to Smith. In each of these designs an axle bearing a caster is movable between two slots, one of which results in retraction of the caster into it's housing, and one of which results in extension of the caster for moving the object. The object to which the caster is attached must be both lifted and moved laterally to re-position the caster.

A retractable caster described in U.S. Pat. No. 2,779,049 to Hoddevik swings between two positions, by tilting the object to which it is attached. In one of these positions, the object may be moved across a surface by rolling the caster. The object will be stationary in the second position, as the caster lies at an angle to its vertical position, between the surface and the underside of the object. The Hoddevik design requires the use of a caster, as opposed to a roller which has a smaller diameter than a caster, a longer width for supporting heavier objects, and motion restricted to forwards and backwards, as opposed to multiple angled directions.

The caster may be moved from its retracted position into the position in which it may be rolled across the surface by lifting the side of the object which is opposite the caster, to a height greater than the caster's distance from the surface. This may require a large force for heavy objects. Furthermore, this lifting action may result in shifting a second caster, at a different place on the object, to its retracted position.

U.S. Pat. No. 2,814,498 to Hull describes a retractable carriage mounting in which a caster may exist in one of two positions. A lock mechanism must be manually disengaged prior to moving the caster to its retracted position.

Each of the retractable caster or roller designs known in the prior art is useful for its intended purpose. However, these designs share certain limitations. The bulkiness inherent in these mechanisms, particularly when the caster is retracted, make it impossible to use most of these devices for equipment which lies flush on a floor surface. Furthermore, many of these designs require manipulation of the mechanism by hand or by foot to alternate between the extended and retracted positions. Alternatively, some of these designs require the object to be significantly lifted prior to engaging the caster mechanism, which may be difficult if the object is heavy machinery. A device is needed which may be attached to furniture and equipment either with or without legs, and which is securely positioned either to move the object or maintain a stationery location, without complex adjustments or manipulation.

DISCLOSURE OF THE INVENTION

Summary of the Invention

An object of this invention is to provide a simple process for moving an object across a surface, and then securing that object in a stable position.

Another object of this invention is to provide a simple, rotatable roller device to be attached to objects of a variety of weights and shapes, to allow such an object to be easily moved across a surface and to be secured in a stable position.

The mechanism utilized in this method of moving objects across a surface includes a rigid plate with an upper face and a lower face. The upper face of the rigid plate is attachable to the under side of the object to be moved. Formed within the lower face of the rigid plate is a slot, suitable to receive a bar. The slot may extend through the upper face of the rigid plate.

A bar having a plate edge and a roller edge, and having two ends, is of a size and shape suitable for being received into the slot of the rigid plate. When seated in the slot, the bar is held perpendicular to the rigid plate.

A holding means is attached to the rigid plate, to hold the bar in close proximity to the lower face of the rigid plate. The holding means is fashioned to allow the bar to be rotated from a position in which the plate edge is seated in the slot of the rigid plate, to a position in which the bar is parallel to the rigid plate.

The rotatable roller mechanism also includes a roller means. The roller means may comprise a plurality of rollers or wheels surrounding an axle, which axle is attached to two connecting pieces, each of which is attached to the roller edge of the bar, and each of which extends from the bar a distance sufficient to prevent the rollers from coming into contact with the bar.

The novel features that are considered characteristic of the invention are set forth with particularity in the claims. The invention itself, both as to its construction and its method of operation, together with additional objects and advantages thereof, will best be understood from the description of specific embodiments which follows, when read in conjunction with the accompanying drawings.

BRIEF DESCRIPTION OF THE DRAWINGS

FIG. 1 is a perspective view of an object to which is attached a rotatable roller, in a movable position permitting the object to be easily moved across a surface.

FIG. 2 is a front view of a rotatable roller according to the present invention, with the roller in a movable position facilitating movement across a surface.

FIG. 3 is a side view of a rotatable roller according to the present invention, with the roller in a movable position which permits an object to which the mechanism is attached to be rolled across a surface.

DETAILED DESCRIPTION OF THE PREFERRED EMBODIMENT

Figure 5:
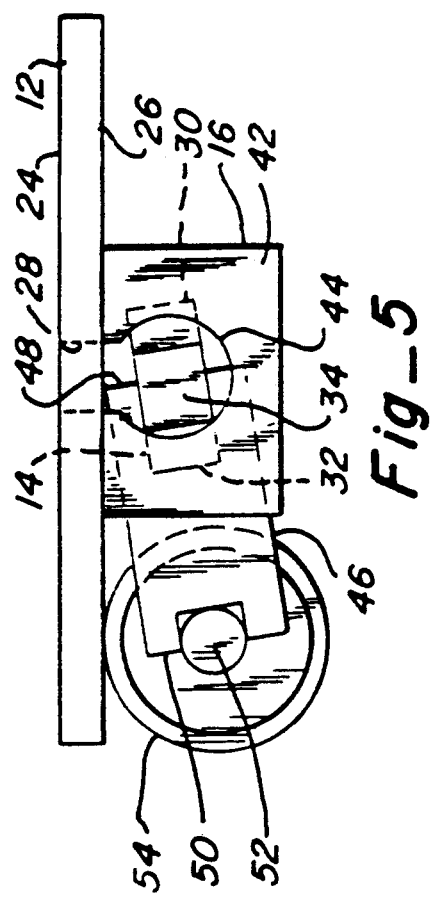
FIG. 5 is a side view of a rotatable roller according to the present invention, with the roller in a stationery position which permits an object to which the mechanism is attached to lie securely on a surface, without engaging the roller.

The features of the rotatable roller technique according to the present invention can be better understood by reference to FIG. 1. A rotatable roller device 10 comprises a rigid plate 12 (not shown in FIG. 1), a bar 14, a holding means 16, and a roller means 18. When the bar 14 is positioned as shown in FIGS. 2 and 3, the object 20 to which the roller device is attached may be easily moved across a surface (not shown). Once the object 20 has been moved to a desired location, the roller device 10 is easily rotated to the stationery position shown in FIG. 5, in which the roller means 18 is disengaged, to permit the object 20 (not shown in FIG. 5) to be securely situated without further movement.

The rigid plate 12 has an upper face 24 and a lower face 26. The upper face 24 is configured to permit the upper face 24 to be conveniently attached to the object 20. A slot 28 is formed in the lower face 26 of the rigid plate 12, and may extend through the rigid plate 12 to the upper face 24.

The bar 14 comprises a plate edge 30, a roller edge 32, and two ends 34. In an embodiment as shown in FIG. 2, each end may be extended by an extension segment 38,40 which is smaller than the bar 14. The plate edge 30 is of a size and shape which permits the plate edge 30 to fit securely within the slot 28, when the rigid plate 12 is lowered onto the bar 14 with the bar 14 perpendicular to the rigid plate 12.

The holding means 16 is connected to the rigid plate 12. While holding the bar 14 in close proximity to the rigid plate 12, the holding means 16 permits the bar 14 to rotate. In this manner, the holding means 16 permits the bar 14 to be secured in a movable position as shown in FIG. 2, in which the bar 14 is seated in the slot 28, and to be rotated 90 degrees in either direction to be secured in a stationery position as shown in FIG. 5, where the bar 14 is parallel to the rigid plate 12.

Figure 4:
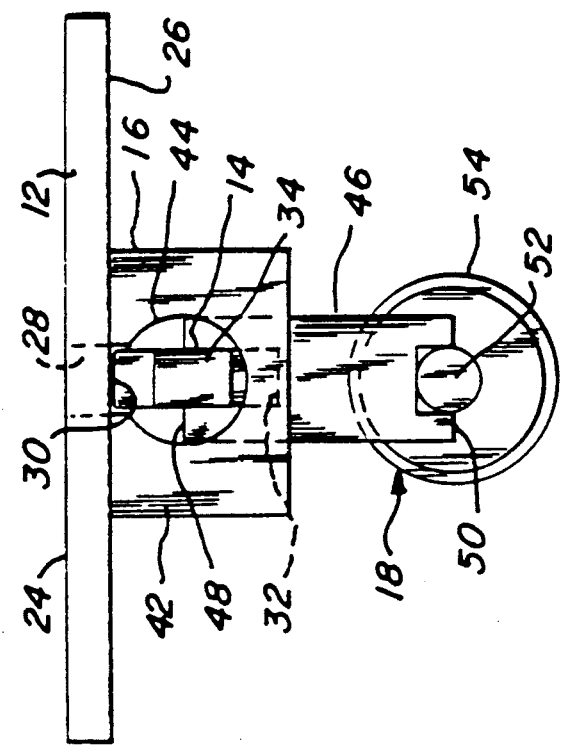
FIG. 4 is a side view of a rotatable roller according to the present invention, with the roller dropped from the movable position into an intermediate position which permits the roller to be shifted to a stationery position.

The holding means 16 may advantageously comprise two blocks 42 each having a hole 44 formed therein to receive each end 34 of the bar 14. Each hole 44 may be located adjacent to the slot 28 so that the bar 14 may be held in a position in which the plate edge 30 is seated in the slot 28. Each hole 44 is sufficiently large to permit the bar 14 to be lowered from the slot 28 to an intermediate position as shown in FIG. 4. From the intermediate position, the bar 14 may be rotated to a stationery position, as shown in FIG. 5, in which the bar 14 is parallel to the rigid plate 12. Alternatively, if extension segments 38,40 are attached to each end 34 of the bar 14, each hole 44 must be sufficiently large to enable the extension segments 38,40 to freely rotate.

The roller means 18 may include two connecting pieces 46 extending from and attached to the roller edge 32 of the bar 14. Although the drawings show an embodiment in which the roller means 18 resides between the holding means 16, it is understood that other embodiments are possible. For example, the bar 14 may extend outward beyond each block 42 of the holding means 16, in which case the connecting pieces 46 might extend from the roller edge 32 external to the holding means 16.

Each connecting piece 46 is attached at one end 48 to the roller edge 32 of the bar 14 and at the other end 50 to an axle 52. Surrounding the axle 52 is a single roller or a plurality of rollers 54. The rollers 54 may comprise wheels, casters, or flat rollers. The rollers 54 may be separated from each other and from the connecting pieces 46 by washers 56.

Figure 6:
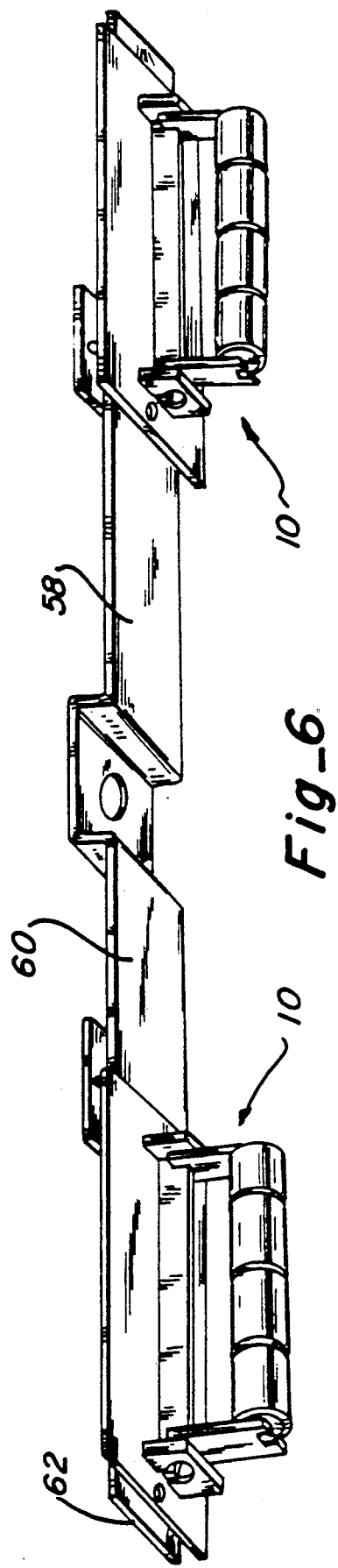
FIG. 6 is a perspective view of a plurality of rotatable rollers, according to the present invention, attached to a connecting piece to allow the plurality of rotatable rollers to be connected to the under side of a object to be moved.

Multiple rotatable roller devices 10 may be attached to the underside of an object 20 by connecting the upper face 24 of each rigid plate 12 to the object 20. Alternatively, as shown in FIG. 6, a plurality of rotatable roller devices 10 may be mounted on a mounting strip 58, by connecting the upper face 24 of each rigid plate 12 to the lower face 60 of the mounting strip 58. The upper face 62 of the mounting strip 58 may then be conveniently attached to the object 20.

The rotatable roller device 10 may be advantageously used in the process of moving an object 20 across a surface (not shown), and then securely positioning that object 20 in a desired location. As shown in FIG. 4, when the object 20 is raised vertically, gravity causes the bar 14 to be held within the holding means 16 in an intermediate position, with the bar 14 perpendicular to the rigid plate 12. As the object 20 is lowered vertically, the bar 14 fits securely into the slot 28 of the rigid plate 12. As a result, as shown in FIG. 2 and FIG. 3, the bar 14 remains perpendicular to the rigid plate 12, in the movable position, and the connecting pieces 46 extend toward the surface (not shown) where the rollers 54 are held in contact with the surface. The object 20 may then be easily pushed to a new location on the surface, and will glide upon the roller means 18.

Once the object 20 has been moved to a desired location, the rotatable roller device 10 may be easily rotated to secure the position of the object 20. The object 20 is raised vertically, so that the bar 14 drops out of the slot 28, into the intermediate position shown in FIG. 4. The object 20 is then tilted in either of two directions, causing the bar 14 to rotate within the holding means 16 so that the bar 14 is no longer perpendicular to the rigid plate 12. The object 20 is then lowered, causing the bar 14 to rest between the rigid plate 12 and the surface, with the bar 14 in a stationery position, as shown in FIG. 5, parallel to the rigid plate 12. The roller means 18 is thus not in contact with the surface, and the object 20 may not be easily moved.

The invention has been described in detail with particular reference to preferred embodiments thereof. As will be apparent to those skilled in the art in the light of the accompanying disclosure, many alterations, substitutions, modifications, and variations are possible in the practice of the invention without departing from the spirit and scope of the invention.

I claim:

1. A device to be attached to an object to permit that object to be moved across a surface or to remain stationery on that surface, comprising:
   (a.) a rigid plate having an upper face and a lower face, adapted to allow the upper face to be held in contact with the object to be moved, having a slot formed in the lower face,
   (b.) a bar having a plate edge and a roller edge, and having two ends, said plate edge being adapted to permit the plate edge to be received into the slot of the rigid plate, in such a manner that the bar is held perpendicular to the rigid plate when the plate edge is located in the slot of the rigid plate,
   (c.) holding means for holding the bar, which holding means is connected to the rigid plate and holds the bar in proximity to the lower face of the rigid plate, which holding means permits the bar to be moved from a position in which the plate edge is located in the slot of the rigid plate, to a position in which the bar is parallel to the rigid plate, and
   (d.) roller means attached to the roller edge of the bar.

2. A device as described in claim 1, wherein said slot extends from the lower face to the upper face of the rigid plate.

3. A device as described in claim 1, wherein said holding means comprises:
   two blocks, each block attached to the lower face of the rigid plate, having a hole formed within each block to receive the bar, each hole being located adjacent to the slot in the rigid plate so that the bar may be held in a position in which the plate edge is located in the slot of the rigid plate, and each hole being large enough to permit the bar to be rotated to a position in which the bar is parallel to the rigid plate.

4. A device as described in claim 1, wherein said roller means comprises:
   (a.) two connecting pieces, each connecting piece being attached to the roller edge of the bar, each connecting piece extending from the roller edge to permit an axle supporting a roller to be attached to each connecting piece without said roller coming into contact with the roller edge,
   (b.) an axle attached to each connecting piece, and
   (c.) a roller surrounding the axle.

5. A device as described in claim 4, wherein a plurality of rollers surround the axle.

6. A device as described in claim 5, wherein each of the rollers is separated by a washer.

7. A device as described in claim 5, wherein a washer surrounds the axle between each connecting piece and the roller adjacent to that connecting piece.

8. A device as described in claim 1, wherein said roller means comprises:

(a.) two connecting pieces, each connecting piece being attached to the roller edge of the bar, each connecting piece extending from the roller edge to permit an axle supporting a wheel to be attached to each connecting piece without said wheel coming into contact with the roller edge,
   (b.) an axle attached to each connecting piece, and
   (c.) a wheel surrounding the axle.

9. A device as described in claim 8, wherein a plurality of wheels surround the axle.

10. A device as described in claim 1, wherein an extension segment smaller than the bar is attached to each end of the bar and extends into the holding means.

11. A device to be attached to an object to be moved, permitting that object to be moved across a surface or to remain stationery on that surface, comprising:
    (a.) a rigid mounting strip having an upper face and a lower face, adapted to allow the upper face to be held in contact with the object to be moved,
    (b.) a plurality of rigid plates, each having an upper face and a lower face, each rigid plate adapted to allow the upper face to be held in contact with the lower face of the mounting strip, and each rigid plate having a slot formed in the lower face of that rigid plate,
    (c.) a plurality of bars, each having a plate edge and a roller edge, and having two ends, each plate edge being adapted to permit the plate edge to be received into the slot of one of the rigid plates, in such a manner that the bar is held perpendicular to that rigid plate when the plate edge is located in the slot of the rigid plate,
    (c.) a plurality of holding means for holding each of the bars, each of which holding means is connected to a rigid plate and holds one of the bars in proximity to the lower face of the rigid plate, which holding means permits the bar to be moved from a position in which the plate edge is located in the slot of the rigid plate, to a position in which the bar is parallel to the rigid plate, and
    (d.) a plurality of roller means, each of which roller means is attached to the roller edge of on of the bars.

12. A method of moving an object across a surface, comprising the steps of:
    (a.) attaching to the object a device comprising a rigid plate having an upper face and a lower face, adapted to allow the upper face to be held in contact with the object to be moved, having a slot formed in the lower face; a bar having a plate edge and a roller edge, and having two ends, said plate edge being adapted to permit the plate edge to be received into the slot of the rigid plate, in such a manner that the bar is held perpendicular to the rigid plate when the plate edge is located in the slot of the rigid plate; a holding means for holding the bar, which holding means is connected to the rigid plate and holds the bar in proximity to the lower face of the rigid plate, which holding means permits the bar to be moved from a position in which the bar is parallel to the rigid plate to a position in which the bar is perpendicular to the rigid plate; and a roller means attached to the roller edge of the bar,
    (b.) lifting the object to allow the bar to drop into the position in which the bar is perpendicular to the rigid plate, (c.) lowering the object to allow the plate edge of the rigid plate to be received by the slot of the rigid plate, causing the roller means to be held in contact with the surface, and (d.) pushing the object.

13. A method of placing an object into a stationery position with respect to a surface on which the object is located, comprising the steps of:

(a.) attaching to the object a device comprising a rigid plate having an upper face and a lower face, adapted to allow the upper face to be held in contact with the object, having a slot formed in the lower face; a bar having a plate edge and a roller edge, and having two ends, said plate edge being adapted to permit the plate edge to be received into the slot of the rigid plate, in such a manner that the bar is held perpendicular to the rigid plate when the plate edge is located in the slot of the rigid plate; a holding means for holding the bar, which holding means is connected to the rigid plate and holds the bar in proximity to the lower face of the rigid plate, which holding means permits the bar to be moved from a position in which the bar is parallel to the rigid plate to a position in which the bar is perpendicular to the rigid plate; and a roller means attached to the roller edge of the bar, (b.) lifting the object to allow the bar to drop so that the plate edge is not located within the slot, (c.) causing the bar to rotate to a stationery position in which the bar is parallel to the plate, and (d.) lowering the object adjacent to the surface, while the bar is in the stationery position in which the bar is parallel to the plate.

* * * * *